United States Patent
Nakajima et al.

(10) Patent No.: US 9,110,235 B2
(45) Date of Patent: Aug. 18, 2015

(54) RETROREFLECTIVE SHEETING AND LICENSE PLATE WITH REDUCED RETROREFLECTIVITY AT HIGH ENTRANCE ANGLES

(75) Inventors: Toshitaka Nakajima, Yamagata-Pref. (JP); Masami Yokoyama, Yamagata-Pref. (JP); Akira Muramoto, Kanagawa (JP); Bruce D. Orensteen, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 569 days.

(21) Appl. No.: 13/502,056

(22) PCT Filed: Oct. 12, 2010

(86) PCT No.: PCT/US2010/052357
§ 371 (c)(1),
(2), (4) Date: Apr. 13, 2012

(87) PCT Pub. No.: WO2011/046953
PCT Pub. Date: Apr. 21, 2011

(65) Prior Publication Data
US 2012/0200709 A1  Aug. 9, 2012

Related U.S. Application Data

(60) Provisional application No. 61/252,233, filed on Oct. 16, 2009.

(51) Int. Cl.
*G02B 5/12* (2006.01)
*G02B 5/128* (2006.01)

(52) U.S. Cl.
CPC .................................... *G02B 5/128* (2013.01)

(58) Field of Classification Search
CPC .................................. B60Q 1/30; B60Q 1/32
See application file for complete search history.

(56) References Cited

U.S. PATENT DOCUMENTS

| | | |
|---|---|---|
| 2,326,634 A | 8/1943 | Gebhard |
| 2,407,680 A | 9/1946 | Palmquist |
| 3,190,178 A | 6/1965 | McKenzie |
| 3,758,193 A | 9/1973 | Tung |
| 3,801,183 A | 4/1974 | Sevelin |
| 3,830,682 A | 8/1974 | Rowland |
| 4,025,159 A | 5/1977 | McGrath |
| 4,082,426 A | 4/1978 | Brown |
| 4,721,649 A | 1/1988 | Belisle |
| 4,983,436 A | 1/1991 | Bailey |
| 5,064,272 A | 11/1991 | Bailey |

(Continued)

FOREIGN PATENT DOCUMENTS

| | | |
|---|---|---|
| EP | 0416742 | 3/1991 |
| EP | 0795138 | 9/1997 |

(Continued)

*Primary Examiner* — Jennifer L. Doak

(57) ABSTRACT

The present application relates to retroreflective sheeting that is capable of use in a license plate and that can be accurately read and/or detected by an ALPR system. The retroreflective sheeting is a microsphere-based retroreflective sheeting that provides reduced retroreflectivity at high entrance angles. The retroreflective sheeting can also be a microsphere-based retroreflective sheeting that exhibits reduced retroreflectivity of incident infra-red light from high entrance angles and substantially unaffected retroreflectivity of incident visible light from entrance angles in the vicinity of the normal.

23 Claims, 4 Drawing Sheets

(56) References Cited

U.S. PATENT DOCUMENTS

| | | |
|---|---|---|
| 5,066,098 A | 11/1991 | Kult |
| 5,069,964 A | 12/1991 | Tolliver |
| 5,200,851 A | 4/1993 | Coderre |
| 5,262,225 A | 11/1993 | Wilson |
| 5,272,562 A | 12/1993 | Coderre |
| 6,024,455 A | 2/2000 | O'Neill et al. |
| 6,157,486 A | 12/2000 | Benson |
| 6,243,201 B1 | 6/2001 | Fleming |
| 6,325,515 B1 | 12/2001 | Coderre |
| 6,361,850 B1 | 3/2002 | Billingsley et al. |
| 6,852,157 B2 | 2/2005 | Hirschmann |
| 7,329,447 B2 | 2/2008 | Chirhart |
| 7,387,393 B2 | 6/2008 | Reich |
| 8,459,807 B2 * | 6/2013 | Herbert et al. ............... 359/530 |
| 2003/0016368 A1 | 1/2003 | Aman |
| 2006/0256439 A1 | 11/2006 | Yukawa et al. |
| 2008/0226906 A1 | 9/2008 | Nomura |
| 2009/0202105 A1 | 8/2009 | Castro Abrantes et al. |
| 2010/0253885 A1 | 10/2010 | Jones |

FOREIGN PATENT DOCUMENTS

| | | |
|---|---|---|
| TW | 536469 | 6/2003 |
| TW | 200600838 | 1/2006 |
| TW | 1284212 | 7/2007 |
| TW | 200741613 | 11/2007 |
| WO | WO 92-19994 | 11/1992 |
| WO | WO 99-36805 | 7/1999 |
| WO | WO 00-68714 | 11/2000 |
| WO | WO 01/17773 | 3/2001 |
| WO | WO 2007-005357 | 1/2007 |
| WO | WO 2007/075518 | 7/2007 |

\* cited by examiner

RETROREFLECTIVE SHEETING AND LICENSE PLATE WITH REDUCED RETROREFLECTIVITY AT HIGH ENTRANCE ANGLES

CROSS REFERENCE TO RELATED APPLICATIONS

This application is a national stage filing under 35 U.S.C. 371 of PCT/US2010/052357, filed Oct. 12, 2010, which claims priority to Provisional Application No. 61/252,233, filed Oct. 16, 2009, the disclosure of which is incorporated by reference in its/their entirety herein.

The present disclosure generally relates to microsphere-based retroreflective sheeting having reduced retroreflectivity at high entrance angles, to a license plate including such retroreflective sheeting, and to an automated license plate reader system capable of reading such a license plate.

BACKGROUND

Retroreflective materials are characterized by the ability to redirect light incident on the material back toward the originating light source. This property has led to the widespread use of retroreflective sheeting for a variety of traffic and personal safety uses. Retroreflective sheeting is commonly employed in a variety of articles, for example, road signs, barricades, license plates, pavement markers and marking tape, as well as retroreflective tapes for vehicles and clothing.

Two known types of retroreflective sheeting are cube corner sheeting and microsphere-based sheeting. Cube corner retroreflective sheeting, sometimes referred to as "prismatic" sheeting, typically comprises a thin transparent layer having a substantially planar first surface and a second structured surface comprising a plurality of geometric structures, some or all of which include three reflective faces configured as a cube corner element.

Microsphere-based sheeting, sometimes referred to as "beaded" sheeting, employs a multitude of microspheres typically at least partially embedded in a binder layer and having associated specular or diffuse reflecting materials (e.g., pigment particles, metal flakes or vapor coats, etc.) to retroreflect incident light. Due to the symmetrical geometry of beaded retroreflectors, microsphere based sheeting exhibits the same total light return regardless of orientation, i.e. when rotated about an axis normal to the surface of the sheeting. Thus, such microsphere-based sheeting has a relatively low sensitivity to the orientation at which the sheeting is placed on a surface. In general, however, such sheeting has a lower retroreflective efficiency than cube corner sheeting.

Various types of microsphere-based retroreflective sheeting are known. For example, U.S. Pat. No. 2,407,680 to Palmquist describes "a reflector structure which by day appears to be continuously coated with paint of one color and by night ... appears to be continuously coated with a brilliant paint of a different color" (col. 13, lines 57-60). FIG. 1 of the present disclosure is FIG. 6 from U.S. Pat. No. 2,407,680. As shown in FIG. 1 of the present disclosure, prior art microsphere-based retroreflective sheeting 40 includes a flat back reflector 31 having a light-reflective face and a transparent spacing film 32 attached to flat back reflector 31 and bonded to a transparent binder layer 33. A layer of transparent microspheres 34 are at least partially embedded in transparent binder layer 33 such that the back extremity of the microspheres touches or closely approaches spacing film 32 and the front extremity of the microspheres projects beyond binder layer 33. Spacing film 32 and binder layer 33 together constitute a matrix that holds the microspheres in a fixed position and in a spaced relationship to back reflector 31. A pigmented, opaque barrier layer 35 is disposed between the sides of adjacent microspheres. The front surface of the microspheres is visible by diffuse daylight and determines the daylight appearance of the retroreflective sheeting. The nighttime appearance of the retroreflective sheeting is determined by the back reflector.

U.S. Pat. No. 3,758,193 to Tung describes various microsphere-based retroreflective sheetings that reflect infra-red light. FIG. 2A of the present disclosure is FIG. 1 of U.S. Pat. No. 3,758,193. As shown in FIG. 2A of the present disclosure, prior art retroreflective sheeting 10 includes an infra-red transmissive, visible light absorptive layer 11 coated on a microsphere-based sheeting 12. Microsphere-based sheeting 12 includes a support layer 13, a layer of spherical, visually transparent glass beads 14 partially embedded in support layer 13, a reflective layer 15 (e.g., aluminum) covering the back extremity of glass beads 14 to provide a reflective surface that returns radiation through beads 14, and a visibly transparent exterior layer 16.

FIG. 2B of the present disclosure is FIG. 2 of U.S. Pat. No. 3,758,193 to Tung. As shown in FIG. 2B of the present disclosure, prior art retroreflective sheeting 19 includes an infra-red transmissive, visible radiation absorptive layer 20 including a material that transmits infra-red radiation and absorbs visible radiation. In the implementation shown in FIG. 2B, infra-red transmissive, visible radiation absorptive layer 20 includes pigment particles 25. Infra-red transmissive, visible radiation absorptive layer 20 is positioned between visibly transparent glass beads 21 and a reflective layer 22 (e.g., aluminum) covering the back extremity of glass beads 21 to provide a reflective surface that returns radiation through glass beads 21. As shown in FIG. 3, glass beads 21 are at least partially embedded in infra-red transmissive, visible radiation absorptive layer 20. Reflective layer 22 is adjacent to a support layer 23, and glass beads 21 are covered with an exterior layer 24.

U.S. Pat. No. 7,387,393 to Reich et al. (counterpart to Japanese Patent Application Publication No. 2007-171956) describes a low-visibility retroreflective visual tag that includes an infra-red blocking material on a retroreflective substrate. In at least some embodiments, the infra-red blocking material forms a pattern capable of recognition by an infra-red camera when the low-visibility retroreflective visual tag is illuminated by an infra-red light source.

U.S. Pat. No. 4,082,426 to Brown (counterpart to Japanese Patent Application Publication No. S53-68596) describes microsphere-based retroreflective sheeting including markings that are invisible when the sheeting is viewed under retroreflective viewing conditions from a position perpendicular to the sheeting but visible when the sheeting is viewed under retroreflective viewing conditions at an angle. To accomplish this effect, retroreflection in the image areas is reduced. FIG. 3 of the present disclosure is FIG. 1 from U.S. Pat. No. 4,082,426 to Brown. As shown in FIG. 3 of the present disclosure, retroreflective sheeting 60 includes a top layer 61; a layer of transparent, spherical beads 62 (e.g., glass microspheres) supported in a transparent binder layer 63; a spacing layer 64 coated over the back extremities of beads 62 and generally contoured so as to generally follow the curved surface of the back extremities of beads 62; an image layer 65 coated onto spacing layer 64; a specularly reflective layer 66 adjacent to portions of spacing layer 64 and image layer 65; and a back layer 67 (e.g., a layer of adhesive or other polymeric material that protects specularly reflective layer 66, provides a means for attachment of sheeting 60 to a substrate, and/or provides strength to sheeting 60).

European Patent Application No. 0416742 (counterpart to Japanese Patent Application Publication No. H03-75996) describes a license plate including materials selectively absorptive or transmissive in the near infra-red spectrum. Consequently, different images appear when the license plate is viewed in light of different spectral ranges. In at least some embodiments, the infra-red absorptive materials form alphanumeric characters or symbols.

In recent years, the use of microsphere-based retroreflective sheeting has been investigated for a use in license plates. However, in at least some instances, use of microsphere-based retroreflective sheeting results in poor visibility and an inability to read the characters on the license plate due to halation (the spreading of light beyond its desired boundaries in a developed photographic image) when the retroreflective license plate is imaged in an automated license plate reader ("ALPR") system.

ALPR systems detect and recognize a vehicle using an electronic system. Exemplary uses for ALPR include, for example, automatic tolling, traffic law enforcement, searching for vehicles associated with crimes, and facility access control. One advantage of ALPR systems is that they are can be used almost universally, since almost all areas of the world require that vehicles have license plates with visually identifiable information thereon. However, the task of recognizing visual tags can be complicated. For example, the read accuracy from an ALPR system is largely dependent on the quality of the captured image as assessed by the reader. Existing systems have difficulty distinguishing tags from complex backgrounds and handling variable lighting. One exemplary ALPR system is described in U.S. Pat. No. 7,387,393 to Reich et al. (counterpart to Japanese Patent Application Publication No. 2007-171956). ALPR systems typically use an infra-red camera and an infra-red light source that emits light rays that are incident upon the license plate. The infra-red camera and/or infra-red light source in many ALPR systems is located above or in the vicinity of the road. Consequently, the infra-red light emitted by the camera and/or light source is incident on the license plate at high entrance angles.

SUMMARY

The present inventors recognized a need for microsphere-based retroreflective sheeting that is capable of use in a license plate and that can be accurately read and/or detected by an ALPR system. The present inventors also recognized that there is currently no known microsphere-based retroreflective sheeting that provides the reduced retroreflectivity at high entrance angles desirable for use in a license plate that could be read by an ALPR system. The present inventors also recognized that there is currently no known microsphere-based retroreflective sheeting exhibiting reduced retroreflectivity of incident infra-red light from high entrance angles and substantially unaffected retroreflectivity of incident visible light from entrance angles in the vicinity of the normal. These qualities are desirable for a retroreflective sheeting suitable for use in a license plate that could be read by an ALPR system. The present inventors also recognized that inclusion of infra-red absorbing or scattering materials in microsphere-based retroreflective sheeting could create the types of retroreflective sheeting described above.

One object of the present application is to provide retroreflective sheeting that is capable of use in a license plate and that can be accurately read and/or detected by an ALPR system. Another object of the present application is to create a microsphere-based retroreflective sheeting that provides the reduced retroreflectivity at high entrance angles. Another object of the present application is to create a microsphere-based retroreflective sheeting that exhibits reduced retroreflectivity of incident infra-red light from high entrance angles and substantially unaffected retroreflectivity of incident visible light from entrance angles in the vicinity of the normal.

One exemplary embodiment of the present application includes a binder layer; microsphere lenses at least partially buried in the binder layer; a spacer layer; a reflector layer adjacent to the spacer layer; and an infra-red non-transmissive material. The infra-red non-transmissive material can be, for example, in the binder layer or in a separate infra-red non-transmissive material layer. The retroreflective sheet can be microsphere-enclosed, microsphere-encapsulated, or microsphere-exposed.

Another exemplary embodiment of the present application is a retroreflective sheet that includes a bead bonding layer, microsphere lenses at least partially buried in the bead bonding layer, a spacer layer, a reflector layer adjacent to the spacer layer, and an infra-red non-transmissive layer disposed between the spacer layer and the reflector layer.

Another exemplary embodiment of the present application provides is a retroreflective sheet that includes a protective layer; a bead bonding layer including an infra-red non-transmissive material; microsphere lenses at least partially buried in the bead bonding layer; a spacer layer transparent to visible light and contoured so as generally to follow the backside faces of the microsphere lenses; and a reflector layer covering the backside face of the spacer layer.

Another exemplary embodiment of the present application provides a license plate utilizing any of the retroreflective sheets described above.

Another exemplary embodiment of the present application provides an ALPR system including: a license plate utilizing any of the retroreflective sheets described above; a light source that directs light at the license plate; and a machine capable of photographing license plate.

DETAILED DESCRIPTION

The present application describes microsphere-based retroreflective sheeting that provides reduced retroreflectivity at high entrance angles. The present application also describes microsphere-based retroreflective sheeting that exhibits reduced retroreflectivity of incident infra-red light from high entrance angles and substantially unaffected retroreflectivity of incident visible light from entrance angles in the vicinity of the normal. Such retroreflective sheeting is capable of use in a license plate and can be accurately read and/or detected by an ALPR system. The microsphere-based retroreflective sheeting of the present application includes infra-red absorbing or scattering materials that cause the retroreflective sheeting to (1) appear bright when illuminated by visible light from the normal direction and (2) appear darker when illuminated by infra-red light from a direction displaced from the normal. By appearing darker when illuminated by infra-red light from high entrance angles, the incidence of halation is minimized when the retroreflective sheeting is photographed by an infra-red camera.

As used herein, the term "transparent" indicates transmittance for desired wavelength that is greater than or equal to 30%, preferably greater than or equal to 50%, and more preferably greater than or equal to 70% at 50 μm thickness. Visible light transmittance can be measured using a spectrophotometer.

Figure 1:
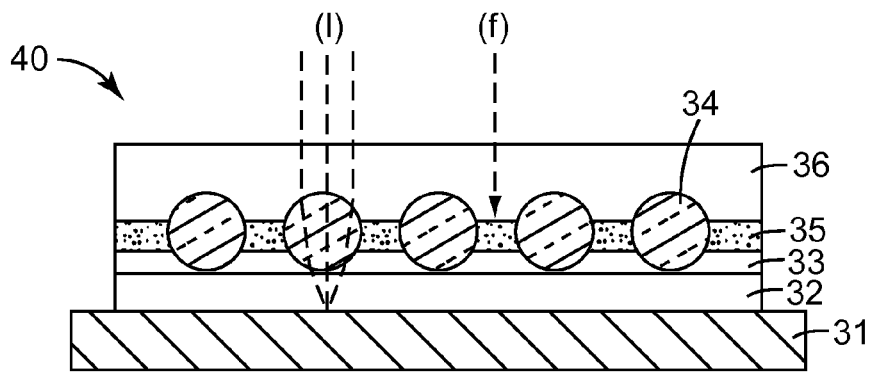
FIG. 1 shows a prior art microsphere-based retroreflective material.
Figure 2A:
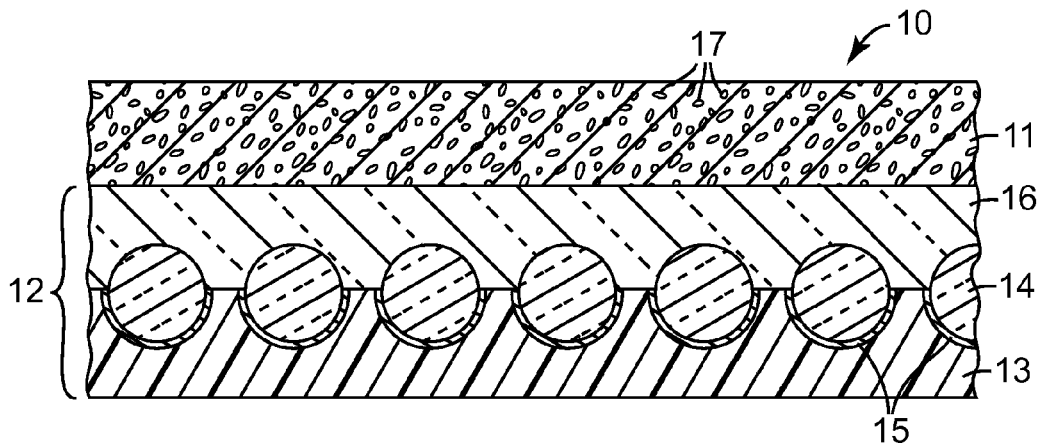
FIGS. 2A and 2B shows another prior art microsphere-based retroreflective material.
Figure 2B:
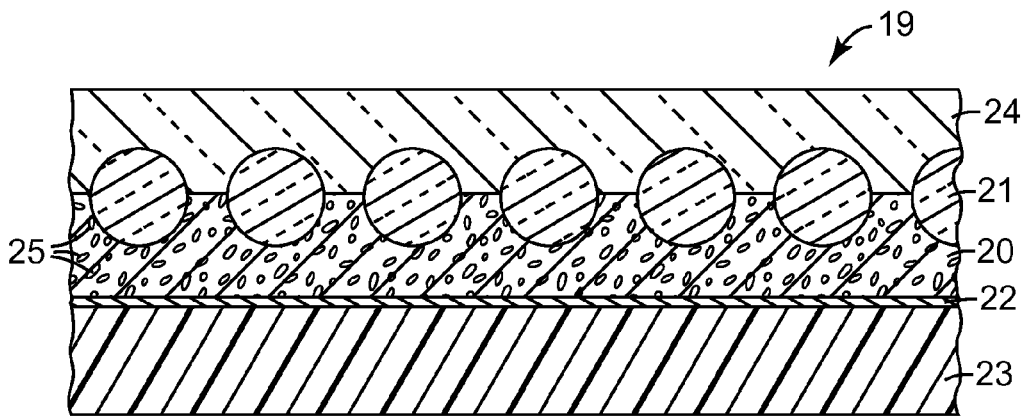
Figure 3:
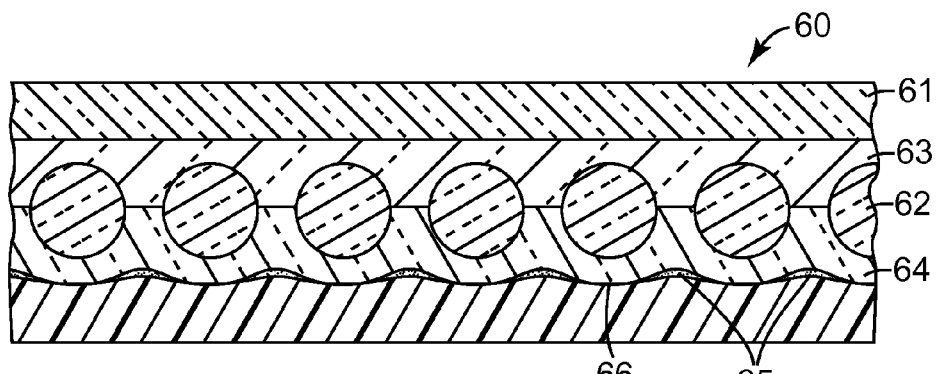
FIG. 3 shows another prior art microsphere-based retroreflective material.
Figure 4:
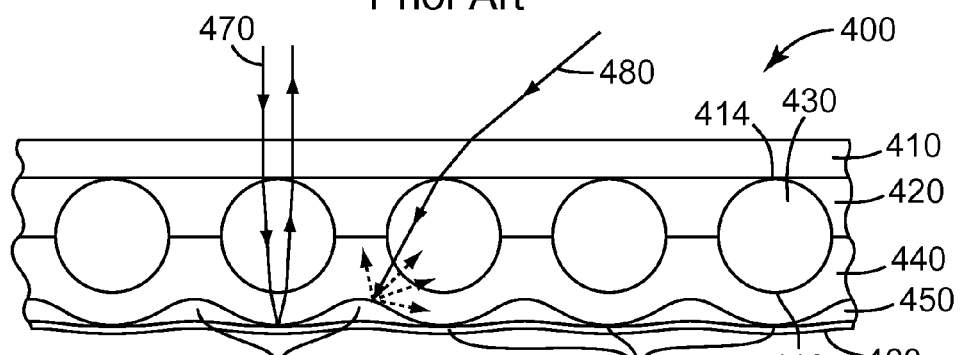
FIG. 4 shows a cross section of one embodiment of a retroreflective sheeting in accordance with the present disclosure.

One exemplary embodiment of the present application is shown in FIG. 4. Retroreflective sheet 400 includes a protective layer 410; a bead bonding layer 420; a layer of microsphere lenses 430 (having front faces 414 and backside faces 416) partially buried in bead bonding layer 420; a spacer layer 440 contoured so as to generally follow backside faces 416 of microsphere lenses 430; reflector layer 460 adjacent to spacer layer 440; and an infra-red non-transmissive layer 450 disposed between spacer layer 440 and reflector layer 460. Infra-red non-transmissive layer 450 is disposed between spacer layer 440 and reflector layer 460 so as to form aperture parts 451. Because aperture parts 451 do not include any infra-red non-transmissive material, so visible light 470 can be reflected on the surface of reflector layer 460 in the aperture areas or parts 451.

When visible light 470 is incident on retroreflective sheet 400 from the normal direction, visible light 470 passes through the microsphere lens 430, is reflected by reflector layer 460, and is redirected toward the originating light source. When infra-red light 480 is incident on retroreflective sheet 400 from high entrance angles (e.g., entrance angles displaced from the vicinity of the normal), infra-red light 480 passes through microsphere lens 430, and at least some of infra-red light 480 absorbed and/or scattered by the infra-red non-transmissive layer 450. In this way, retroreflection of the infra-red light is decreased or suppressed.

Those of skill in the art will appreciate that many changes may be made to the exemplary implementation described above without departing from the scope of the present disclosure. For example, the layer of microsphere lenses 430 as shown in FIG. 4 is a monolayer, but those of skill in the art will appreciate that the layer of microspheres 430 can include stacked microspheres, microspheres having varying distance between them, microspheres of carrying diameter, and the like. Spacer layer 440 as shown in FIG. 4 is contoured so as to generally follow the backside faces 416 of microsphere lenses 430. However, those of skill in the art will appreciate that a spacer layer that generally follows the backside of the microspheres is generally used for wide angle constructions. The present application is also meant to include narrow angle constructions in which the spacer layer would not generally follow the backside of the microspheres. Instead, the spacer layer would be essentially flat. FIG. 4 also includes bead bonding layer 420. Those of skill in the art will appreciate that enclosed-lens microsphere-based retroreflective sheeting may not include a bead bonding layer. In encapsulated-lens sheeting, there is typically only one layer. The beads or microspheres are embedded in the space layer, and are exposed to an air-interface. An example of this construction described, for example, in U.S. Pat. No. 5,064,272. In at least one exemplary construction capable of use in the present application, the reflector is spaced from the microspheres (and not coated directly onto the microsphere) in order to adjust the focal point. In this instance, the "binder film" would actually be the "space coat." Those of skill in the art will also appreciate that the microspheres can be partially embedded in bead bonding layer 420 at depths other than those shown in FIG. 4. Additionally, infra-red non-transmissive layer may also or alternatively be disposed only in valley regions 442 of spacer layer 440.

Also, in some exemplary embodiments, the infra-red non-transmissive material can also be at least somewhat ultraviolet or visible light non-transmissive. In such instances, the retroreflective sheeting will appear darker when illuminated by ultraviolet or visible light at an angle. This embodiment may be desirable in instances where ALPR systems include visible light cameras. In Brazil, for example, the speed enforcement or traffic light control cameras emit a flash of ultraviolet or visible light when taking pictures. As such, these systems may exhibit halation problems when imaging license plates under visible light. Inclusion of infra-red non-transmissive materials that are at least somewhat ultraviolet or visible light non-transmissive can reduce or minimize these halation problems.

Protective layer 410 of FIG. 4 can include any transparent material of sufficient weathering resistance and moldability. Exemplary materials for use in protective layer 410 include, for example, polyester resin, polyolefine resin, acryl resin, polyurethane resin, PVC resin, fluorine-contained polymer, ionomer resin, and the like. Protective layer 410 preferably has a thickness of between about 10 μm and about 200 μm, more preferably between about 30 μm and about 100 μm. Dyes or pigments can be added to the protective layer.

Bead bonding layer 420 can include any transparent resin having sufficient moldability. Exemplary materials for use in bead bonding layer 420 include, for example, resin, alkyd resin, polyester resin, melamine resin, and the like. Bead bonding layer 420 preferably has a thickness of between about 5% to about 95% of bead size, more preferably between about 20% and about 70% of bead size. Dyes or pigments can be added to the bead bonding layer.

Microspheres 430 can be, for example, glass bead, although other optically transparent materials, such as, for example, resin materials can also be used. The refractive index of microspheres 430 can be, for example, between about 2.2 and about 2.3. Although the figures show completely uniform placement of microsphere lenses having identical dimensions in a monolayer, as long as the effect of the present disclosure is not lost, the sizes of the microsphere lenses can vary and the gaps between adjacent microsphere lenses can also vary. Average particle size of the microsphere lenses can be found using a particle size measurement apparatus utilizing the laser diffractive scattering method.

In the specific embodiment shown in FIG. 4, spacer layer 440 is contoured so as generally to follow the backside faces of microsphere lenses 430. Spacer layer 440 has a curved surface due to the concavities and convexities of the microsphere lenses. Exemplary materials for use in spacer layer 440 include, for example, polyvinylbutiral resin, butylated melamine resin, and the like. Spacer layer 440 preferably has a thickness of between about 5 µm and about 30 µm, more preferably between about 10 µm and about 25 µm. Those of skill in the art will appreciate that a spacer layer that generally follows the backside of the microspheres is generally used for narrow angle constructions. The present application is also meant to include wide angle constructions in which the spacer layer would not generally follow the backside of the microspheres.

Reflector layer 460 preferably has good adhesion to the spacer layer 440 and the infra-red non-transmissive layer 450. Reflector layer 460 can be formed, for example, using metal vapor deposition. Aluminum, silver, or the like may be used as the metal. Alternatively, reflector layer 460 can include a multilayer reflective coating disposed on the microspheres, such as is described, for example, in U.S. Pat. No. 6,243,201 to Fleming. The thickness of reflector layer 460 is preferable between about 300 to about 800 Angstroms.

Infra-red non-transmissive layer 450 includes an infra-red non-transmissive material. The term "infra-red non-transmissive material" in the present application refers to a material that absorbs or scatters infra-red radiation and that does not substantially allow transmission of infra-red radiation. The infra-red transmittance proportion of the infra-red non-transmissive material is largely dependent on the concentration and dispersal of the infra-red non-transmissive material through the thickness of the layer in which the infra-red non-transmissive material is located. For example, in the embodiment shown in FIG. 4, the infra-red transmittance proportion of infra-red non-transmissive layer 450 will largely depend on the concentration and dispersal of the infra-red non-transmissive material through the thickness of infra-red non-transmissive layer 450. The infra-red transmittance for infra-red radiation may be less than or equal to 50%, and is preferably less than or equal to 10%.

Exemplary infra-red non-transmissive materials include near infra-red radiation absorption agents that absorb or scatter near infra-red radiation (e.g., wavelengths of between about 760 nm and about 1500 nm). Transmittance of infra-red radiation can be measured using a spectrophotometer. Exemplary organic infra-red non-transmissive materials include, for example, carbon black, polymethine type compounds, pyrylium type compounds, thiopyrylium type compounds, squalium type compounds, croconium type compounds, azulenium type compounds, phthalocyanine type compounds, tetrahydrocholine type compounds, dithiol metal complex salt type compounds, naphthoquinone type compounds, antimonate type compounds, anthraquinone type compounds, triphenylmethane type compounds, aminium type compounds, dimonium type compounds, and the like. Exemplary inorganic infra-red non-transmissive materials include, for example, compounds such as antimony tin oxide (ATO), indium tin oxide (ITO), $LaB_6$, tin oxide, tin-antimony oxide, titanium dioxide, iron oxide, aluminum, tin-lead alloy, gold, silver, and the like. In some exemplary embodiments, the powder of the infra-red reflection agent is dispersed in a resin.

Figure 5:
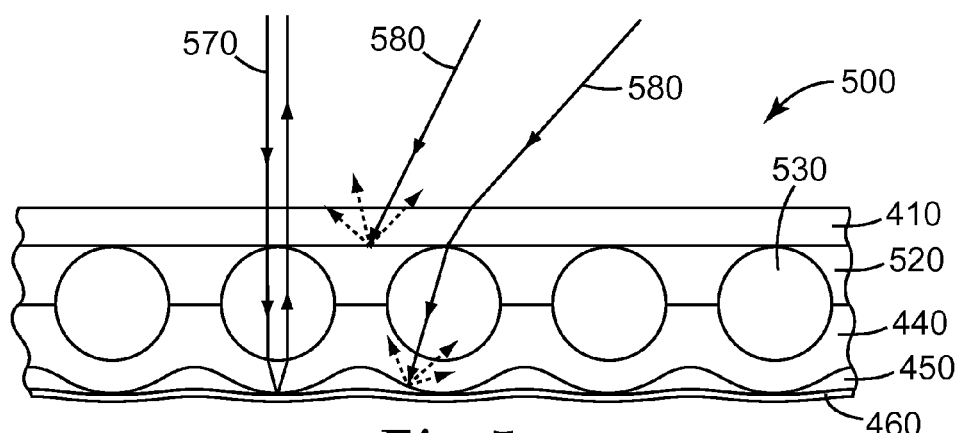
FIG. 5 shows a cross section of another embodiment of a retroreflective sheeting in accordance with the present disclosure.

An alternative embodiment is shown in FIG. 5. Retroreflective sheeting 500 of FIG. 5 is substantially the same as retroreflective sheeting 400, except that in addition to including an infra-red non-transmissive material in infra-red non-transmissive layer 450 disposed between spacer layer 440 and reflector layer 460, bead bonding layer 520 includes an infra-red non-transmissive material. By including the infra-red non-transmissive material in bead bonding layer 520 as well as in infra-red non-transmissive layer 450, infra-red retroreflectivity is further decreased. Specifically, when visible light 570 is incident on retroreflective sheet 500 from the normal direction, visible light 570 passes through the microsphere lens 430, is reflected by reflector layer 460, and is redirected toward the originating light source. When infra-red light 580 is incident on retroreflective sheet 500 from high entrance angles (e.g., entrance angles displaced from the vicinity of the normal), infra-red light 580 passes through microsphere lens 430, and at least some of infra-red light 580 absorbed and/or scattered by infra-red non-transmissive layer 450 and bead bonding layer 420. In this way, retroreflection of the infra-red light is decreased or suppressed.

When the infra-red non-transmissive material is included in the bead bonding layer, the thickness of the bead bonding layer is preferably between about 1% to about 99% of the average particle diameter of the microsphere lenses. Infra-red radiation cannot be sufficiently absorbed and/or scattered when the bead bond layer thickness is less than 1% of the average particle diameter of the microsphere lenses. Further, transmission of visible light is largely blocked when the bead bond layer thickness exceeds 99% of the average particle diameter of the microsphere lenses. In the embodiment shown in FIG. 5, the infra-red transmittance proportion of bead bonding layer 520 will largely depend on the concentration and dispersal of the infra-red non-transmissive material through the thickness of bead bonding layer 520. The infra-red transmittance for infra-red radiation may be less than or equal to 50%, and is preferably less than or equal to 10%.

The retroreflective sheeting shown in FIGS. 4 and 5 can be produced by known methods. One exemplary method involves applying a transparent resin solution to the upper face of a release sheet that acts as a protective layer. Microspheres are then dispersed on or dropped onto the transparent resin solution, and the transparent resin solution is allowed to cure to form the bead bonding layer. Exemplary transparent resins include, for example, thermal curing resins, photocuring resins, and resins dissolved in solvent. After the bead bonding layer is cured, resin for forming the spacer layer is applied to the uncovered portion of the microsphere lenses. The thickness of the cured spacer layer is roughly uniform, and resin application conditions are selected such that the spacer layer is roughly parallel to the convexities formed by the microsphere lenses. By adjusting the viscosity of the resin forming the spacer layer, a spacer layer may be formed that generally conforms to the convexities of the monolayer of microsphere lenses. The resin for forming the bead bonding layer and the resin for forming the spacer layer may be the same as the resin of the protective layer or may be different resins. Next, a resin including an infra-red non-transmissive layer is applied to the spacing coat layer. By adjusting the amount of resin applied or the viscosity of the resin forming the infra-red non-transmissive layer, an infra-red non-transmissive layer may be formed between the spacer layer and the reflector layer that forms aperture parts. The infra-red non-transmissive layer is then cured, and a metal is vacuum vapor deposited onto the infra-red non-transmissive layer to form the reflector layer.

An alternative method of making the sheeting of the present application is described, for example, in Patent Nos. EP0795138, WO2000/68714, WO92/19994 (corresponding to JP H06-507737). These references generally relate to preparation of a slurry-type sheeting. Such sheetings exhibit good brightness and appearance.

Figure 6:
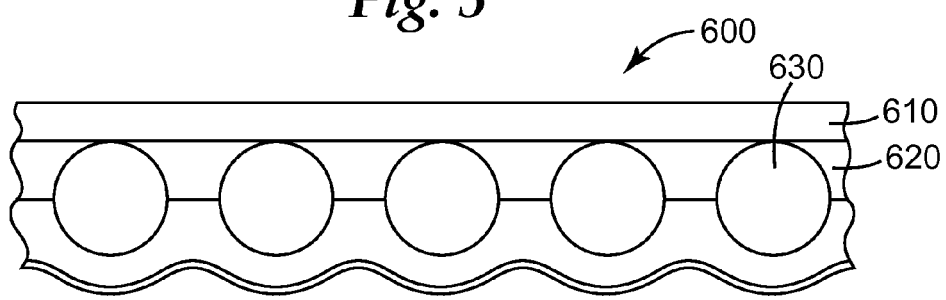
FIG. 6 shows a cross section of another embodiment of a retroreflective sheeting in accordance with the present disclosure.

An alternative embodiment is shown in FIG. 6. Retroreflective sheeting 600 of FIG. 6 includes bead bonding layer 620 including an infra-red non-transmissive material that absorbs and/or scatters visible and infra-red light, a protective layer 610, and microsphere lenses 630.

Figure 7:
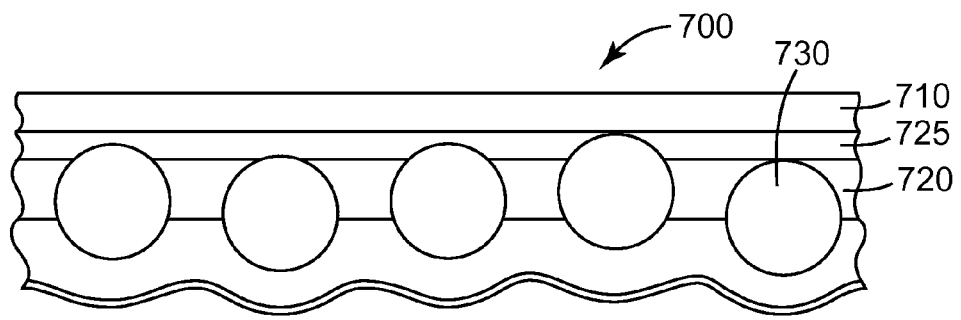
FIG. 7 shows a cross section of another embodiment of a retroreflective sheeting in accordance with the present disclosure.

An alternative embodiment is shown in FIG. 7. In retroreflective sheeting 700 of FIG. 7, a transparent resin layer 725 is provided between protective layer 710 and microsphere lenses 730 so that the microsphere lenses 730 are disposed and partially buried in transparent resin layer 725. When a transparent resin layer is provided, the transparent resin layer together with the bead bonding layer may retain the microsphere lenses. When the bead bonding layer between the protective layer and microsphere lenses 730 is thick, the reduction of retroreflection of visible light from the normal direction increases such that retroreflective sheeting 700 cannot be used as a retroreflector.

Figure 8:
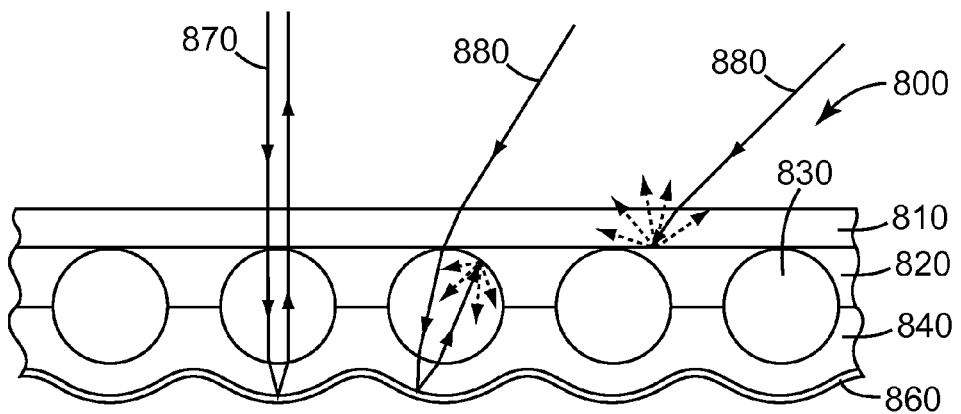
FIG. 8 shows a cross section of another embodiment of a retroreflective sheeting in accordance with the present disclosure.

An alternative embodiment is shown in FIG. 8. Retroreflective sheeting 800 of FIG. 8 includes a protective layer 810, a bead bonding layer 820 including an infra-red non-transmissive material, microsphere lenses 830 partially buried in bead bonding layer 820, a spacer layer 840 transparent to visible light and contoured so as generally to follow the backside faces of microsphere lenses 830, and a reflector layer 860 adjacent to spacer layer 840. The term "transparent to visible light" indicates a peak transmittance for visible light of between about 400 and about 800 nm wavelength that is greater than or equal to 30%, preferably is greater than or equal to 50%, and more preferably is greater than or equal to 70% at a 50 micrometer thickness. These various layers can be formed from the same materials and by the same procedures as the layers of the above described embodiments.

Figure 9:
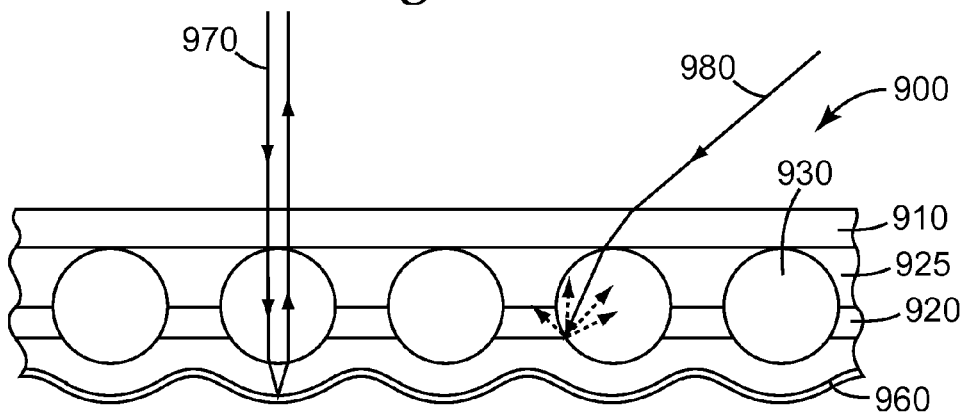
FIG. 9 shows a cross section of another embodiment of a retroreflective sheeting in accordance with the present disclosure.

An alternative embodiment is shown in FIG. 9. Retroreflective sheeting 900 of FIG. 9 includes a bead bonding layer that has two separate parts: first bead bonding layer 925 and second bead bonding layer 920. A two-part bead bonding layer can be made, for example, by forming a first bead bonding layer 925 including an infra-red non-transmissive material that is applied to protective layer 910, which can be formed as described above. Prior to curing the resin for forming first bead bonding layer 925, microsphere lenses 930 are buried in first bead bonding layer 925. After the first bead bonding layer 925 is cured, a resin including an infra-red non-transmissive material is applied to first bead bonding layer 925 and is cured. The infra-red non-transmissive material used in first and second bead bonding layers 925 and 920 may be the same or different.

Figure 10:
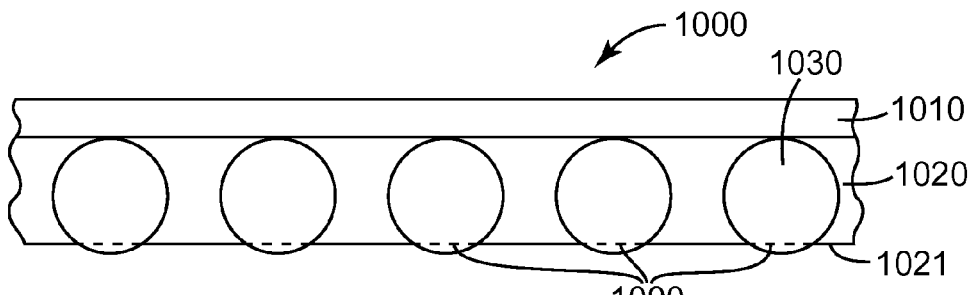
FIG. 10 shows a cross section of another embodiment of a retroreflective sheeting in accordance with the present disclosure.

An alternative embodiment of retroreflective sheeting 1000 is shown in FIG. 10 in which the backside face 1021 of bead bonding layer 1020 includes an aperture part 1090 conforming to the spherical face of microsphere lens 1030. The reduction in retroreflection of light incident from the normal is high when the gap between microsphere lenses 1030 and protective layer 1010 is large or when bead bonding layer 1020 is thick.

Although the specific microsphere-based sheeting embodiments shown and described herein relate to enclosed microspheres, those of skill in the art will appreciate that the present application covers the inclusion of infra-red absorbing or scattering materials in exposed-lens type microsphere-based retroreflective sheeting, enclosed-lens type microsphere-based retroreflective sheeting, and encapsulated-lens type microsphere-based retroreflective sheeting. A beaded sheeting of the exposed-lens type is described, for example, in U.S. Pat. No. 2,326,634 to Gebhard. The exposed-lens type sheeting of Gebhard includes a layer of lens elements exposed to an air interface. The lens elements preferably have a refractive index between about 1.7 and 2.0. A beaded sheeting of the encapsulated type is described, for example, in U.S. Pat. No. 3,190,178 to McKenzie and U.S. Pat. No. 4,025,159 to McGrath. These patents describe the use of a cover film to maintain the air interface of encapsulated lens type sheeting while protecting the sheeting from exposure to the elements (e.g., water) which may negatively affect the optical performance of the sheeting. A beaded sheeting of the enclosed-lens type is described, for example, in U.S. Pat. No. 2,407,680 to Palmquist.

Microsphere-based sheeting includes a multitude of microspheres typically at least partially embedded in a binder layer and associated specular or diffuse reflecting materials (such as metallic vapor or sputter coatings, metal flakes, or pigment particles). "Enclosed-lens beaded sheeting" refers to retroreflective sheeting in which the beads are in spaced relationship to the reflector but in full contact with resin. "Encapsulated lens beaded sheeting" is designed such that the reflector is in direct contact with the bead but the opposite side of the bead is in a gas interface. Illustrative examples of microsphere-based sheeting are disclosed in U.S. Pat. No. 4,025,159 (McGrath); U.S. Pat. No. 4,983,436 (Bailey); U.S. Pat. No. 5,064,272 (Bailey); U.S. Pat. No. 5,066,098 (Kult); U.S. Pat. No. 5,069,964 (Tolliver); and U.S. Pat. No. 5,262,225 (Wilson).

EXAMPLES

Although examples and comparative examples are described below to explain the present disclosure in further detail, the present disclosure is not limited by these examples.

Example 1

A plasticized vinyl resin solution including a thermal stabilizer and a UV stabilizer was applied to a paper release sheet that had been previously coated with an alkyd demolding agent. This formed a protective layer having a thickness of 55 µm. After the protective layer was heated and softened, a solution containing an uralkyd resin and crosslinking melamine was applied to the protective layer. After semi-drying the treated protective layer, microsphere lenses having a refractive index of 2.26 and an average particle diameter of 57 µm were deposited by the pouring-flowing method. The microsphere lenses became partially buried in the 34.2 µm thick applied layer (also referred to as the bead bonding layer) such that the microsphere lenses partially extended above the applied layer. Next, the applied layer was heat cured using a solution containing polyvinyl butyral resin and butylated melamine curing agent having a viscosity of 6,000 cps. A notch bar was used to apply the solution onto the microsphere lenses. The assembly was dried in an oven. A spacer layer was formed having a thickness of about 19 µm (nearly the same thickness along the curved surface shape of the microsphere lenses). The thickness of each layer was measured using a microscope and a contact-type thickness measurement gauge. To the solution described above for forming the bead bonding layer was added a solution containing 2 percent by weight of a white pigment ((62.5 parts of titanium dioxide (TRI-PURE® R960 sold by E.I. duPont De Nemours and Co.) and 37.5 parts of polyester plasticizer (PN280 sold by Adeka Corp.)). The resulting solution had a viscosity of 100 cps or less. This solution was applied to the spacer coating using a no. 3 wire bar to form the infra-red non-transmissive layer. Thereafter, aluminum was evaporated and deposited to form the reflector layer.

Example 2

The retroreflective sheet of Example 1 was prepared except that the infra-red non-transmissive layer was formed using a solution containing 1.0 percent by weight of an infra-red absorption agent (EXCOLOR® 10A sold by Nippon Shokubai Co., Ltd.). The resultant cross sectional structure of the retroreflective sheeting of Example 2 was similar to that shown in FIG. 4.

Example 3

The retroreflective sheet of Example 1 was prepared except that the bead bonding layer was made with a solution containing 2 percent by weight of a white pigment (62.5 parts of titanium dioxide, 37.5 parts of a polyester plasticizer) (1000 cps viscosity). The resultant cross sectional structure of the retroreflective sheeting of Example 3 was similar to that shown in FIG. 5.

Example 4

The retroreflective sheet of Example 1 was prepared except that aluminum was vapor deposited on the backside face of the spacer layer to form the reflector layer. The resultant cross sectional structure of the retroreflective sheeting of Example 4 was similar to that shown in FIG. 6.

Example 5

The retroreflective sheet of Example 1 was prepared except that after the protective layer was heated and softened, a solution (used for formation of the transparent resin layer) of the same composition as that used for formation of the bead bonding layer of Example 1 was applied on the softened protective layer. After semi-drying, microsphere lenses were deposited using the pouring-flowing method. The thickness of the transparent resin layer was 27 µm. The transparent resin layer was cured by heating. Thereafter, a notch bar was used to apply the white pigment-containing solution described and used in Example 3. The layer was dried to form a bead bonding layer having a thickness of 22 µm. Thereafter, a transparent spacing layer was formed using the resin used in Example 1. The transparent spacer layer had a thickness of 19 µm. Thereafter, aluminum was vapor deposited on the backside face of the spacer layer to form the reflector layer. The resultant cross sectional structure of the retroreflective sheeting of Example 5 was similar to that shown in FIG. 7.

Example 6

The retroreflective sheet of Example 1 was prepared except that the bead bonding layer was formed from a solution obtained by adding 0.6 percent by weight of an infra-red absorption agent (EXCOLOR® 10A sold by Nippon Shokubai Co., Ltd.) to a solution containing a uralkyd resin and melamine crosslinking agent and adjusting viscosity to 1000 cps. The resultant cross sectional structure of the retroreflective sheeting of Example 6 was similar to that shown in FIG. 7.

Example 7

Processing was performed in the same manner described for Example 1 up to and including the step of heating and softening of the protective layer. Then a notch bar was used to apply a first bead bonding solution (1000 cps viscosity) containing 2 percent by weight of a white pigment (62.5 parts of titanium dioxide, 35.5 parts of a polyester plasticizer) added to a solution containing uralkyd resin and melamine crosslinking agent. After the applied layer was semi-dried, microsphere lenses were distributed in the same manner as described for Example 1. The thickness of the first bead bonding layer was 27 µm. The first bead bonding layer was cured by heating. The second bead bonding solution had a viscosity of 1000 cps and contained 0.6 percent by weight of an infra-red absorption agent (EXCOLOR® 10A sold by Nippon Shokubai Co., Ltd.) added to a solution of solution containing uralkyd resin and melamine crosslinking agent. After the second bead bonding solution was applied and dried, the thickness of the second bead bonding layer was 22 µm. Thereafter, a transparent spacer layer was formed as described in Example 1 to form a transparent spacer layer having a thickness of about 19 µm. Thereafter, aluminum was vapor deposited on the backside face of the spacer layer to form the reflector layer. The resultant cross sectional structure of the retroreflective sheeting of Example 7 was similar to that shown in FIG. 9.

Example 8

Figure 12:
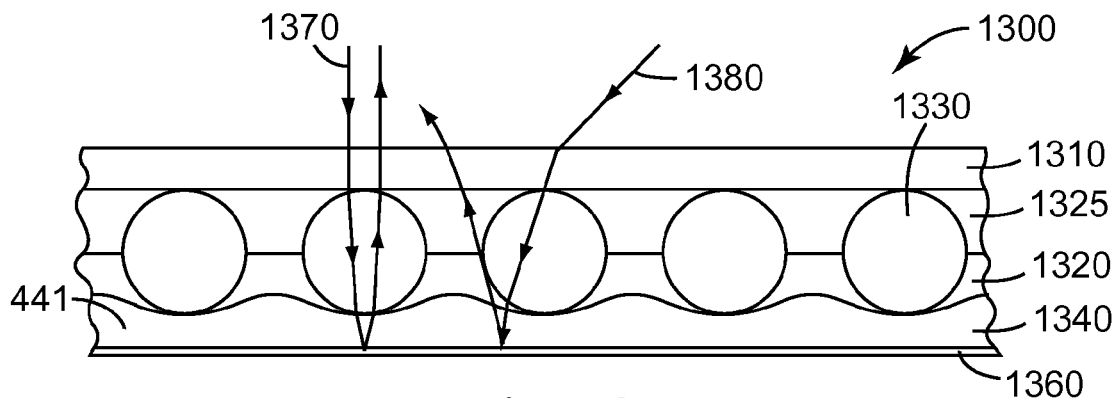
FIG. 12 shows a cross section of another embodiment of a retroreflective sheeting in accordance with the present disclosure.

Processing was performed in the same manner described for Example 1 up to and including the step of curing the bead bonding layer by heating. The bead bonding layer acted as the first bead bonding layer having a thickness of 27 µm. The viscosity of the uralkyd resin and melamine crosslinking agent solution of Example 1 was adjusted to 1000 cps and then was applied as a second bead bonding solution. The second bead bonding solution was dried to form a second bead bonding layer having a thickness of 22 µm. A notch bar was used to apply to this surface the polyvinyl butyral resin and butylated melamine curing agent solution (adjusted to have a viscosity of 3000 cps using a petroleum based solvent (Solvent No. 100 sold by Exxon Mobil Corp)) described in Example 1. The applied solution was then dried to provide a transparent spacer layer. Thickness of the spacer layer was not constant along the curved faces of the microsphere lenses, and thickness of the spacer layer was greater between adjacent microspheres. Thickness of the spacer layer from the microsphere lens surface was about 19 µm. Thereafter, aluminum was vapor deposited on the backside face of the spacer layer to form the reflector layer. The resultant cross sectional structure of the retroreflective sheeting of Example 8 was similar to that shown in FIG. 12.

Example 9

A protective layer was formed as follows: a plasticized vinyl resin solution including a thermal stabilizer and a UV stabilizer and capable of being spread flat was applied to obtain a final thickness of 55 µm on a paper release sheet that had been previously coated with an alkyd demolding agent.

Thereafter, a notch bar was used to apply onto the protective layer a slurry of a solution containing polyvinyl butyral resin and alkylated melamine-formaldehyde resin (having a slurry viscosity of 1200 cps) and microsphere lenses having a refractive index of 2.26 and an average particle diameter of 57 µm (resin solution: microsphere lens weight ratio=100:66). The microsphere lenses were allowed to sink until reaching the protective layer to form a substantially unilaminar array of microsphere lenses. Thereafter, this slurry solution was allowed to air dry for about 10 min. Thereafter, the slurry solution was cured in an oven for 5 minutes at about 95° C., and then was cured in an oven for about 5 min. at about 170° C. to provide a bead bonding layer, a monolayer of microsphere lenses partially buried in the bead bonding layer, and a spacer layer in a single step. The backside face of the spacer layer conformed to the curved surface shape of the microsphere lens. A solution containing 2 percent by weight of a white pigment ((62.5 parts of titanium dioxide (TRI-PURE® R960 sold by E.I. duPont De Nemours and Co.) and 37.5 parts of polyester plasticizer (PN280 sold by Adeka Corp.)) in a solution of uralkyd resin and crosslinking melamine was prepared and its viscosity was adjusted to 100 cps or less. Thereafter, the solution was applied using a no. 3 wire bar to form the infra-red non-transmissive layer. Thereafter, aluminum was vapor deposited to form the reflector layer. The resultant cross sectional structure of the retroreflective sheeting of Example 9 was similar to that shown in FIG. 13.

Comparative Example 1

Figure 13:
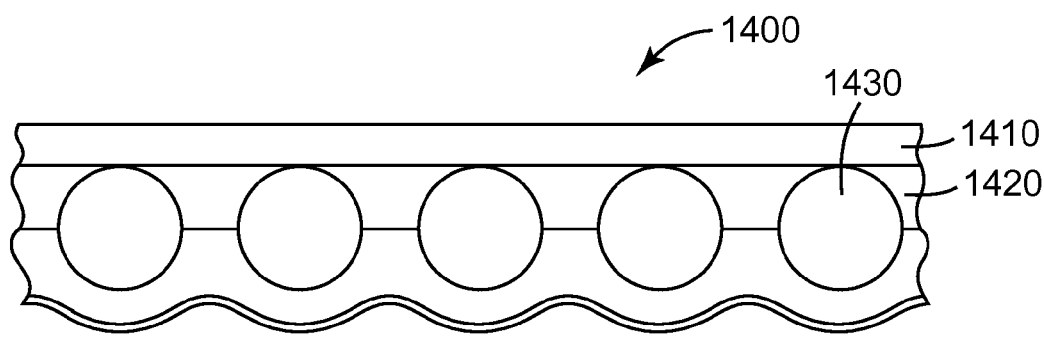
FIG. 13 shows a cross section of a prior art retroreflective sheeting.

A retroreflective sheet (product no. 4750 sold by Sumitomo 3M Ltd.) was used as comparative example 1. The cross sectional structure of retroreflective sheet 1400 is shown in FIG. 13 and includes microspheres 1430 in a bead bonding layer 1420 with a protective layer 1410 adjacent to bead bonding layer 1420. Comparative retroreflective sheeting 1400 does not include an infra-red non-transmissive material.

Figure 11:
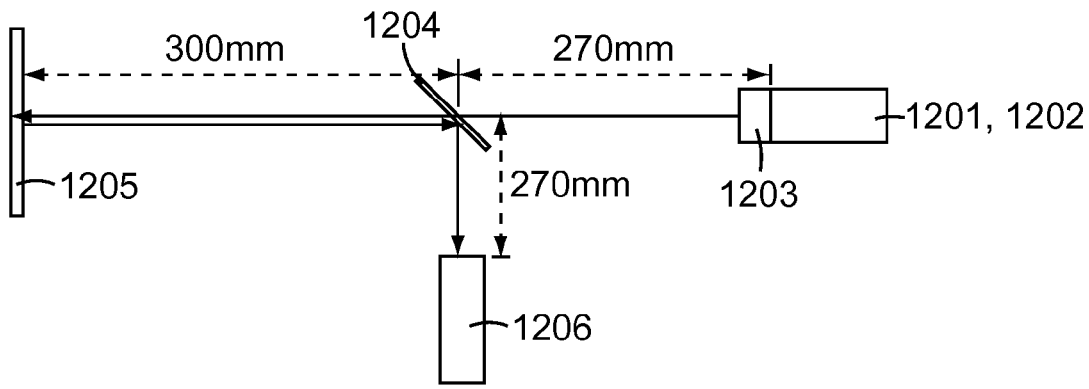
FIG. 11 shows a schematic diagram of the instruments used to evaluate the visible and infra-red retroreflectivity of retroreflective sheeting samples in accordance with the present disclosure.

Retroreflectivity of the retroreflective sheeting prepared in the above examples was measured as follows: the measurement equipment was situated as shown in FIG. 11. A halogen lamp 1201 (output at 400 nm to 800 nm with a peak wavelength of 625 nm) was used as the light source during measurement of retroreflectivity in the visible region. An LED light source 1202 emitting infra-red light having a wavelength of between about 850 nm and about 890 nm (output at 830 nm to 1000 nm with a peak wavelength of 925 nm) was used as the light source during measurement of retroreflectivity in the infra-red region. A condenser lens 1203 (ML-70 sold by Moritex Corp.) was used for condensing light. Light was input into beam splitter 1204 ((R/T (%)=50/50)), and part of the light was passed though a measurement sample 1205. Light that was retroreflected by measurement sample 1205 was returned in the direction of the beam splitter 1204, and the reflection intensity was measured by sensing the light reflected by the beam splitter 1204 using a detector 1206 (USB2000 sold by Ocean Optics, Inc.). Measurement of retroreflectivity was performed at changing incidence angles by varying the angle of the measurement sample 1205. Based on the results of measurement of the reflection intensity, the relative value of reflection intensity at an angle of incidence was calculated by normalization of the reflection intensity when the angle of incidence was zero.

Viscosity was measured by a viscosity measurement method using the single cylinder type rotary viscometer of JIS Z8803 "Viscosity of Liquid—Methods of Measurement."

Tables 1 and 2 include the results of visible region retroreflectance testing for the retroreflective sheeting made as described above. Tables 3 and 4 include the results of infra-red retroreflectance testing for the retroreflective sheeting made as described above.

TABLE 1

Retroreflectance of the Retroreflective Sheeting of Example 1 in the Visible Wavelength Range

|  | 0 | 5 | 10 | 15 | 20 | 25 | 30 | 35 | 40 | 45 | 50 |
| --- | --- | --- | --- | --- | --- | --- | --- | --- | --- | --- | --- |
| Ex. 1 | 122508 | 234849 | 230187 | 222363 | 208901 | 186698 | 155648 | 119746 | 84427 | 54947 | 33375 |
| Ex. 2 | 106170 | 114391 | 103000 | 84632 | 62680 | 42304 | 28814 | 20607 | 15354 | 12607 | 10124 |
| Ex. 3 | 60149 | 94516 | 85387 | 69896 | 49025 | 30148 | 18309 | 12280 | 9376 | 8289 | 7305 |
| Ex. 4 | 66889 | 53791 | 47307 | 36848 | 24580 | 15049 | 10388 | 8170 | 7740 | 7265 | 7083 |
| Ex. 5 | 84842 | 60819 | 56226 | 46454 | 33449 | 21162 | 14449 | 11104 | 9395 | 8399 | 7796 |
| Ex. 6 | 66122 | 80604 | 75665 | 65752 | 52697 | 39562 | 28867 | 22457 | 19026 | 16738 | 14537 |
| Ex. 7 | 63902 | 58624 | 52265 | 40916 | 28523 | 19055 | 13027 | 9745 | 8427 | 7186 | 6659 |
| Ex. 8 | 84769 | 56948 | 51582 | 41686 | 29149 | 18421 | 12131 | 9403 | 7752 | 7119 | 7247 |
| Ex. 9 | 46993 | 74671 | 69188 | 58486 | 44235 | 30902 | 21093 | 15073 | 10920 | 8689 | 7754 |

TABLE 2

Relative Retroreflectance of the Retroreflective Sheeting of Example 1 in the Visible Wavelength Range

|  | 0 | 5 | 10 | 15 | 20 | 25 | 30 | 35 | 40 | 45 | 50 |
| --- | --- | --- | --- | --- | --- | --- | --- | --- | --- | --- | --- |
| Comparative Example 1 | 1.00 | 0.97 | 0.95 | 0.92 | 0.86 | 0.77 | 0.64 | 0.49 | 0.35 | 0.23 | 0.14 |
| Example 1 | 1.00 | 0.93 | 0.84 | 0.69 | 0.51 | 0.35 | 0.24 | 0.17 | 0.13 | 0.10 | 0.08 |
| Example 2 | 1.00 | 0.89 | 0.80 | 0.66 | 0.46 | 0.28 | 0.17 | 0.12 | 0.09 | 0.08 | 0.07 |
| Example 3 | 1.00 | 0.89 | 0.79 | 0.61 | 0.41 | 0.25 | 0.17 | 0.14 | 0.13 | 0.12 | 0.12 |
| Example 4 | 1.00 | 0.91 | 0.84 | 0.69 | 0.50 | 0.32 | 0.22 | 0.17 | 0.14 | 0.13 | 0.12 |
| Example 5 | 1.00 | 0.95 | 0.89 | 0.77 | 0.61 | 0.45 | 0.33 | 0.26 | 0.22 | 0.20 | 0.19 |
| Example 6 | 1.00 | 0.89 | 0.79 | 0.62 | 0.43 | 0.29 | 0.20 | 0.15 | 0.13 | 0.11 | 0.10 |

TABLE 2-continued

Relative Retroreflectance of the Retroreflective Sheeting of Example 1 in the Visible Wavelength Range

|  | 0 | 5 | 10 | 15 | 20 | 25 | 30 | 35 | 40 | 45 | 50 |
|---|---|---|---|---|---|---|---|---|---|---|---|
| Example 7 | 1.00 | 0.89 | 0.81 | 0.65 | 0.46 | 0.29 | 0.19 | 0.15 | 0.12 | 0.11 | 0.11 |
| Example 8 | 1.00 | 0.88 | 0.82 | 0.69 | 0.52 | 0.36 | 0.25 | 0.18 | 0.13 | 0.10 | 0.09 |
| Example 9 | 1.00 | 0.85 | 0.82 | 0.79 | 0.72 | 0.62 | 0.51 | 0.41 | 0.35 | 0.31 | 0.29 |

TABLE 3

Retroreflectance of the Retroreflective Sheeting of Example 1 in the Infra-Red Wavelength Range

|  | 0 | 5 | 10 | 15 | 20 | 25 | 30 | 35 | 40 | 45 | 50 |
|---|---|---|---|---|---|---|---|---|---|---|---|
| Comparative Example 1 | 11567 | 11270 | 11182 | 10962 | 10667 | 9894 | 8605 | 6851 | 4906 | 3211 | 1929 |
| Example 1 | 7442 | 6954 | 6237 | 5109 | 3709 | 2359 | 1347 | 807 | 537 | 389 | 320 |
| Example 2 | 5270 | 4823 | 4343 | 3588 | 2501 | 1468 | 840 | 517 | 365 | 302 | 269 |
| Example 3 | 2732 | 2456 | 2165 | 1790 | 1129 | 748 | 554 | 398 | 346 | 353 | 375 |
| Example 4 | 4258 | 3958 | 3759 | 3127 | 2245 | 1490 | 930 | 725 | 596 | 511 | 387 |
| Example 5 | 5484 | 5030 | 4650 | 4054 | 3340 | 2646 | 1981 | 1514 | 1263 | 1078 | 963 |
| Example 6 | 1091 | 822 | 720 | 628 | 482 | 423 | 353 | 300 | 274 | 285 | 252 |
| Example 7 | 1910 | 1674 | 1547 | 1310 | 945 | 633 | 467 | 314 | 313 | 283 | 299 |
| Example 8 | 4622 | 4094 | 3830 | 3206 | 2455 | 1679 | 1117 | 781 | 539 | 413 | 367 |
| Example 9 | 3291 | 2914 | 2821 | 2558 | 2365 | 2071 | 1743 | 1390 | 1171 | 990 | 852 |

TABLE 4

Relative Retroreflectance of the Retroreflective Sheeting of Example 1 in the Infra-Red Wavelength Range

|  | 0 | 5 | 10 | 15 | 20 | 25 | 30 | 35 | 40 | 45 | 50 |
|---|---|---|---|---|---|---|---|---|---|---|---|
| Comparative Example 1 | 1.00 | 0.97 | 0.97 | 0.95 | 0.92 | 0.86 | 0.74 | 0.59 | 0.42 | 0.28 | 0.17 |
| Example 1 | 1.00 | 0.93 | 0.84 | 0.69 | 0.50 | 0.32 | 0.18 | 0.11 | 0.07 | 0.05 | 0.04 |
| Example 2 | 1.00 | 0.92 | 0.82 | 0.68 | 0.47 | 0.28 | 0.16 | 0.10 | 0.07 | 0.06 | 0.05 |
| Example 3 | 1.00 | 0.90 | 0.79 | 0.66 | 0.41 | 0.27 | 0.20 | 0.15 | 0.13 | 0.13 | 0.14 |
| Example 4 | 1.00 | 0.93 | 0.88 | 0.73 | 0.53 | 0.35 | 0.22 | 0.17 | 0.14 | 0.12 | 0.09 |
| Example 5 | 1.00 | 0.92 | 0.86 | 0.75 | 0.62 | 0.49 | 0.37 | 0.29 | 0.25 | 0.23 | 0.24 |
| Example 6 | 1.00 | 0.75 | 0.66 | 0.58 | 0.44 | 0.39 | 0.32 | 0.27 | 0.25 | 0.26 | 0.23 |
| Example 7 | 1.00 | 0.88 | 0.81 | 0.69 | 0.49 | 0.33 | 0.24 | 0.16 | 0.16 | 0.15 | 0.16 |
| Example 8 | 1.00 | 0.89 | 0.83 | 0.69 | 0.53 | 0.36 | 0.24 | 0.17 | 0.12 | 0.09 | 0.08 |
| Example 9 | 1.00 | 0.88 | 0.85 | 0.77 | 0.69 | 0.60 | 0.51 | 0.41 | 0.36 | 0.32 | 0.30 |

Digital photographs of license plates made as described in Example 1 and Comparative Example 1 were taken by an infrared camera (No.00-i full spec. type vehicle recognition apparatus sold by A-TEC Co.). The characters (license plate number) of the license plate made as described in Comparative Example 1 could not read due to halation. In contrast, the characters (license plate number) of the license plate made as described in Example 1 could be read.

Although various embodiments and implementations have been described in the present application, except when stated explicitly otherwise, any embodiment of the present application can be produced using any known materials and production methods, including, for example, those described in the prior art, such as, but not limited to, U.S. Pat. No. 2,407,680 and the like.

The recitation of all numerical ranges by endpoint is meant to include all numbers subsumed within the range (i.e., the range 1 to 10 includes, for example, 1, 1.5, 3.33, and 10).

Those having skill in the art will appreciate that many changes may be made to the details of the above-described embodiments and implementations without departing from the underlying principles thereof. Further, various modifications and alterations of the present invention will become apparent to those skilled in the art without departing from the spirit and scope of the invention. The scope of the present application should, therefore, be determined only by the following claims.

What is claimed is:

1. A retroreflective sheet, comprising:
    a binder layer;
    microsphere lenses at least partially buried in the binder layer;
    a spacer layer;
    a reflector layer adjacent to the spacer layer; and
    an infra-red non-transmissive material, wherein the infra-red non-transmissive material is disposed in at least one of a layer between the spacer layer and the reflector layer or the binder layer.

2. The retroreflective sheet of claim 1, wherein the binder layer is a bead bonding layer.

3. The retroreflective sheet of claim 1, wherein the microsphere lenses form a monolayer.

4. The retroreflective sheet of claim 1, wherein the microsphere lenses have a refractive index between 1.7 and 2.3.

5. The retroreflective sheet of claim 1, wherein the spacer layer is contoured so as generally to follow a backside of the microsphere lenses.

6. The retroreflective sheet of claim 1, wherein the reflector layer includes one of a mirror-surfaced reflection layer and a multi-layer optical film.

7. The retroreflective sheet of claim 1, wherein the retroreflective sheet is one of microsphere-enclosed, microsphere-encapsulated, and microsphere-exposed.

8. The retroreflective sheet of claim 1, further including a protective layer.

9. The retroreflective sheet of claim 1, wherein the binder layer has a thickness and the microsphere lenses have an average microsphere diameter, and wherein the binder layer thickness to average microsphere diameter ratio is greater than or equal to 1% and less than or equal to 99%.

10. The retroreflective sheet of claim 1, wherein the infra-red non-transmissive material is in the binder layer.

11. The retroreflective sheet of claim 1, wherein the infra-red non-transmissive material is in a separate, infra-red non-transmissive layer.

12. A license plate utilizing the retroreflective sheet according claim 1.

13. An ALPR system, comprising:
a license plate according to claim 12;
a light source that directs light at the license plate; and
a machine capable of photographing license plate.

14. A retroreflective sheet, comprising:
a protective layer;
a bead bonding layer;
microsphere lenses at least partially buried in the bead bonding layer;
a spacer layer contoured so as generally to follow a backside of the microsphere lenses;
a reflector layer adjacent to the spacer layer; and
an infra-red non-transmissive layer disposed between the spacer layer and the reflector layer.

15. The retroreflective sheet according to claim 14, wherein the bead bonding layer has a thickness and the microsphere lenses have an average microsphere diameter, and wherein thickness of the bead bonding layer relative to average microsphere diameter is greater than or equal to 1% and less than or equal to 99%.

16. The retroreflective sheet according to claim 14, further comprising:
a transparent resin layer partially burying the respective microsphere lenses disposed between protective layer and the bead bonding layer; and
the backside face of the bead bonding layer having a multiplicity of aperture parts conforming to the spherical faces of the microsphere lens.

17. A license plate utilizing the retroreflective sheet according to claim 14.

18. An ALPR system, comprising:
a license plate according to claim 17;
a light source that directs light at the license plate; and
a machine capable of photographing license plate.

19. A retroreflective sheet, comprising:
a protective layer;
a bead bonding layer including an infra-red non-transmissive material;
microsphere lenses at least partially buried in the bead bonding layer;
a spacer layer transparent to visible light and contoured so as generally to follow the backside faces of the microsphere lenses; and
a reflector layer covering the backside face of the spacer layer.

20. The retroreflective sheet according to claim 19 wherein the bead bonding layer has a thickness and the microsphere lenses have an average microsphere diameter, and wherein thickness of the bead bonding layer relative to average microsphere diameter is greater than or equal to 1% and less than or equal to 99%.

21. The retroreflective sheet according to claim 19 further comprising:
a transparent resin layer partially burying the respective microsphere lenses disposed between protective layer and the bead bonding layer; and
the backside face of the bead bonding layer having a multiplicity of aperture parts conforming to the spherical faces of the microsphere lens.

22. A license plate utilizing the retroreflective sheet according to claim 19.

23. An ALPR system, comprising:
a license plate according to claim 22;
a light source that directs light at the license plate; and a machine capable of photographing license plate.

* * * * *